United States Patent [19]

Freadman

[11] Patent Number: 5,722,041
[45] Date of Patent: Feb. 24, 1998

[54] HYBRID HOME-ENTERTAINMENT SYSTEM

[75] Inventor: Tommyca Freadman, Goshen, N.Y.

[73] Assignee: Altec Lansing Technologies, Inc., Milford, Pa.

[21] Appl. No.: 567,559

[22] Filed: Dec. 5, 1995

[51] Int. Cl.$^6$ .................................................. H04N 7/00
[52] U.S. Cl. .............................. 455/6.3; 348/552; 348/6
[58] Field of Search .......................... 455/3.1, 6.3, 4.2; 348/552, 706, 705, 12, 7, 6, 571, 553, 555, 725, 729, 13

[56] References Cited

U.S. PATENT DOCUMENTS

| | | | |
|---|---|---|---|
| 5,283,819 | 2/1994 | Glick et al. | 348/552 |
| 5,534,913 | 7/1996 | Majeti et al. | 348/7 |
| 5,579,308 | 11/1996 | Humpleman | 455/6.3 |

*Primary Examiner*—Victor R. Kostak
*Attorney, Agent, or Firm*—Graham & James LLP

[57] ABSTRACT

Home entertainment center interface apparatus providing remote database access and access coordination is disclosed. The interface can, alternatively, be installed directly on the PCI bus in the computer. The interface provides remote access to the database in response to signals from an RF remote control transmitter. The transmitter can be added as a plug-compatible unit to upgrade an existing video control device. A supplemental chat window is generated by a further plug-compatible upgrade unit in response to address and command signals modulating a dedicated carrier frequency on the cable.

15 Claims, 3 Drawing Sheets

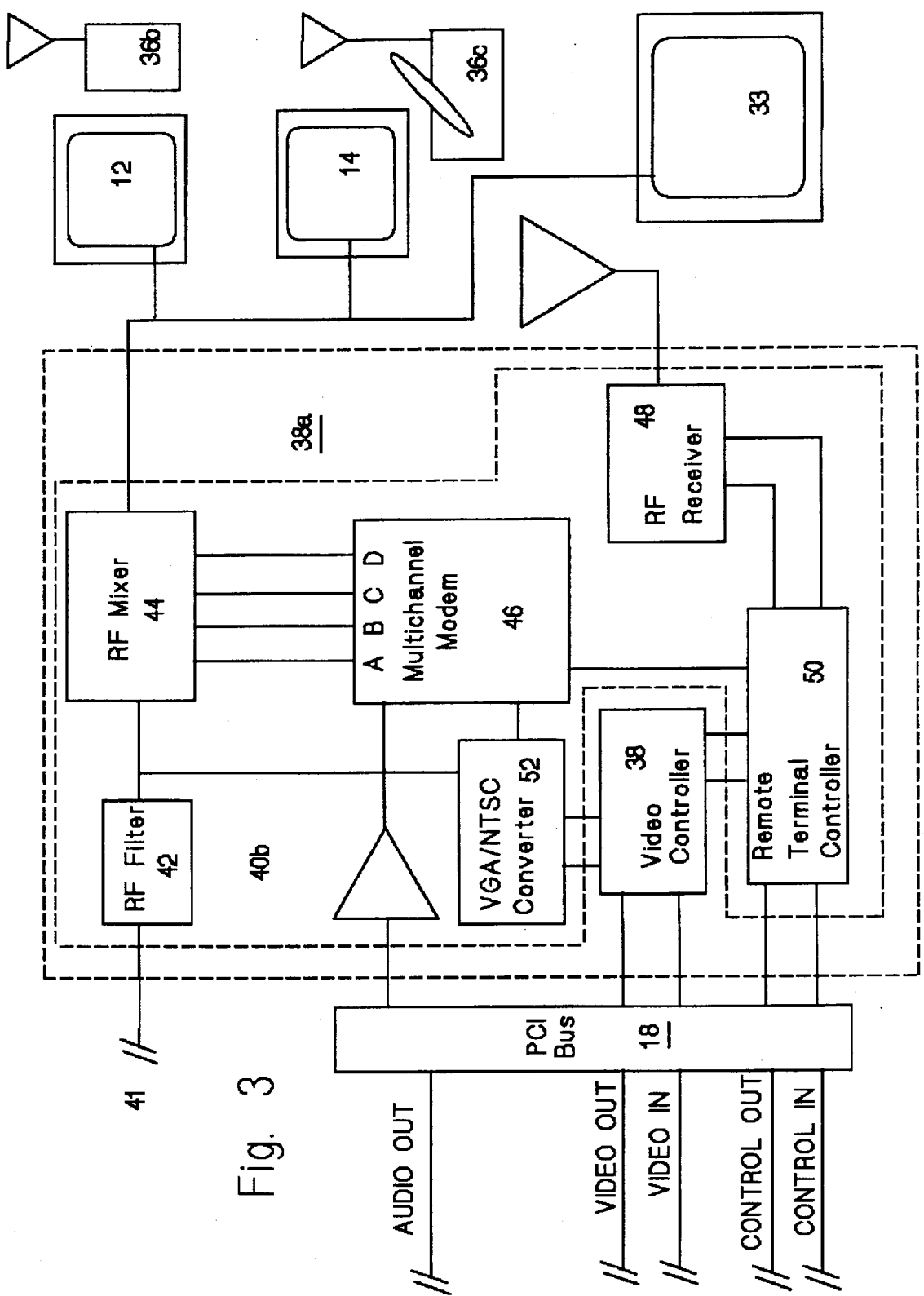

HYBRID HOME-ENTERTAINMENT SYSTEM

BACKGROUND OF THE INVENTION

1. Field of the Invention

The invention is directed to home-entertainment systems. More particularly, it is directed to a home-entertainment system accessory providing remote computer access within a household.

2. Discussion of Related Art

Interactive-television systems are known in the art. These systems provide a modified cable-TV interface box that permits cable-TV viewers to respond to sales offers, viewer-survey questions, etc. that are generated as part of the cable television program material supplied to all cable subscribers by the "head-end" of the cable service system. Viewers' responses are sent by the cable box back to the supplier of the cable-TV program as an electronic signal over the same TV cable, via the head-end cable service facility. Cable modem access to the World-Wide-Web on the Internet through the cable service's head-end facility is also available to consumers.

Multimedia personal computers have been developed for home use as stand-alone terminals. Many of them are only elaborate toys for displaying recreational video games and educational picture dictionaries. The size of conventional computer screens, and speakers, is more suitable for word-processing than to full-motion video or dynamic audio program material. As households having more than one adult computer user become more common, their media display and communication systems will be expected to meet the convenience and quality standards now achieved by home entertainment systems.

The development of household database applications has been stymied by the prevailing view of computers in the home as toys, or at best glorified typewriters. This is a serious stumbling block in the market for such applications, given that consumer software products need volume sales to be profitable. In my view, the key question is how to economically provide persons located at different locations within the household with suitable database server access. In particular, household database applications will be much more attractive to consumers if convenient, independent access to the database for all members of the household can be implemented without major capital outlays. Practical functionality is needed, not more toys.

Database networks installed by businesses use multiple wordprocessing PCs to provide remote access for and e-mail interaction between persons in different parts of the office. However, installing multiple multimedia "toy" terminals for a home network is not practical.

Given the multiprocessing power of the PCs now available to consumers, I believe it is also unnecessary. The database server can process multiple requests, only remote I/O is needed not multiple remote PCs. If database servers for home networks can use the audio-visual equipment already distributed around the household as its terminals, consumers will have the immediate access necessary to make the household database: account records, correspondence records and reference files a practical asset, not just a hobby project.

As a practical matter, many homes already have a network of suitable display terminals and a stand-alone computer suitable for use as the database server. For example, FIG. 1 shows the floor plan of a well-furnished family home having a conventional home entertainment center 10, kitchen 12 and bedroom 14 outlets for cable TV and outlets for an owner-wired stereo-audio 16 and intercom/extension telephone system 17, and a home-office computer 18. Although these rooms are shown in a single-floor layout, bedrooms would very likely be on the second floor and the office in the basement, adding to the practical importance of the extension telephone/intercom functions.

The home entertainment center includes stereo "karaoke" audio equipment 20, and advanced home video equipment 30. The audio equipment includes units that provide CD 22, tape 24 and decoded AM/FM/TV/dialup cable 26 and broadcast 28 audio signal inputs. This audio equipment 20 provides selectable 7-band equalization, theater/surround channels, cordless telephone, Dolby® Pro-Logic™ and karaoke notch filter audio processing.

The video equipment 30 accepts picture-in-picture VCR/CD-ROM 32, and decoded cable 26 and broadcast 28 video signal inputs that are displayed on a projection TV screen 33. The secondary outlets 12, 14 each have their own decoders (not shown), similar to the decoder in the entertainment center 10. However, the cable interface box 26 in the entertainment center 10 also provides an input device 36 for interactive access to cable TV program sources, phone and cable modem services.

The home-office computer 18 is wired to the cable system through its 64-bit VGA video-controller board 38 and uses an MPEG controller on the video board 38 for decoding data from a CD-ROM device 19. The entertainment center video equipment 30 can use the wide dynamic range, low-noise, low-distortion sound provided by the audio equipment 20 with audio material decoded by the VCR/CD-ROM 32, and MTS stereo broadcasts decoded by the TV 33, for better audio imaging.

The interactive TV interface, permits TV viewers to respond to sales offers, viewer-survey questions, etc. in program material on the various cable TV channels from the particular cable service system connected to the interface box 26, and to select the cable channel from across the room. The other cable video screens 12, 14 have infra-red (IR) remote control units for channel selection. One of the bedroom outlets also has a "joystick" control keypad on the video game controller 37 that is also connected to the video outlet 14 in that room.

These electronic devices are the "legacy systems" of the world of consumer electronics, analogous to the legacy systems of the business world. To provide practical, truly useful home-based computer applications for consumers, the new applications need to exploit this installed base of high-quality audio-visual equipment.

New database applications for the home cannot presume that multimedia terminals will ever be added in every room of the house. They are toys with only marginal audio-visual capability, clutter. Moreover, no one can expect consumers to replace the audio and video outputs of legacy home entertainment systems just to try some new, supposedly convenient, database software for the home. In either scenario, at best, the projected advantages of these new database applications are not such that they justify such a capital expense.

SUMMARY OF THE INVENTION

The method and apparatus in accordance with the present invention advantageously provides a hybrid database interface for remote database access and access coordination within an existing home entertainment system.

The interface connects a personal computer to a cable connecting a subscriber cable-video service to a remote video screen and determines on which cable-channel carrier frequency the remote video screen will receive data through the cable from the personal computer. The interface supplies data signals from the computer to the cable on said carrier frequency. RF signals received by the interface from an RF remote-control device control the data received by the remote video screen from the personal computer through the cable on said carrier frequency.

The interface comprises an RF mixer adapted to connect the subscriber cable service to the remote video screen, an RF remote control receiver, a controller connected to said receiver and to said computer, said controller being responsive to said personal computer and to said receiver to select a carrier frequency for supplying signals from the computer to the remote video screen, and a multi-channel modulator adapted to supply a signal from the computer to the remote video screen through said RF mixer on a carrier frequency selected by said controller.

In accordance with the present invention existing home entertainment system components can be used for remote database access and access coordination. In particular, the present invention uses existing cable TV-connections and video screens to distribute the data accessible at the home-office computer throughout the home.

A database access interface and RF transmitters are provided to enable remote access to and operation of the database server. In one aspect of the invention, the RF transmitters may include the conventional IR and interactive-TV control functions of the existing cable-TV video screens.

BRIEF DESCRIPTION OF THE DRAWINGS

The invention will be better understood when the description of a preferred embodiment given below is considered in conjunction with the drawings provided, wherein:

FIG. 3 is a block diagram of a second embodiment of a hybrid database interface in accordance with the present invention.

In these drawings, like items have like reference numerals.

DETAILED DESCRIPTION OF THE PREFERRED EMBODIMENTS

Figure 1:
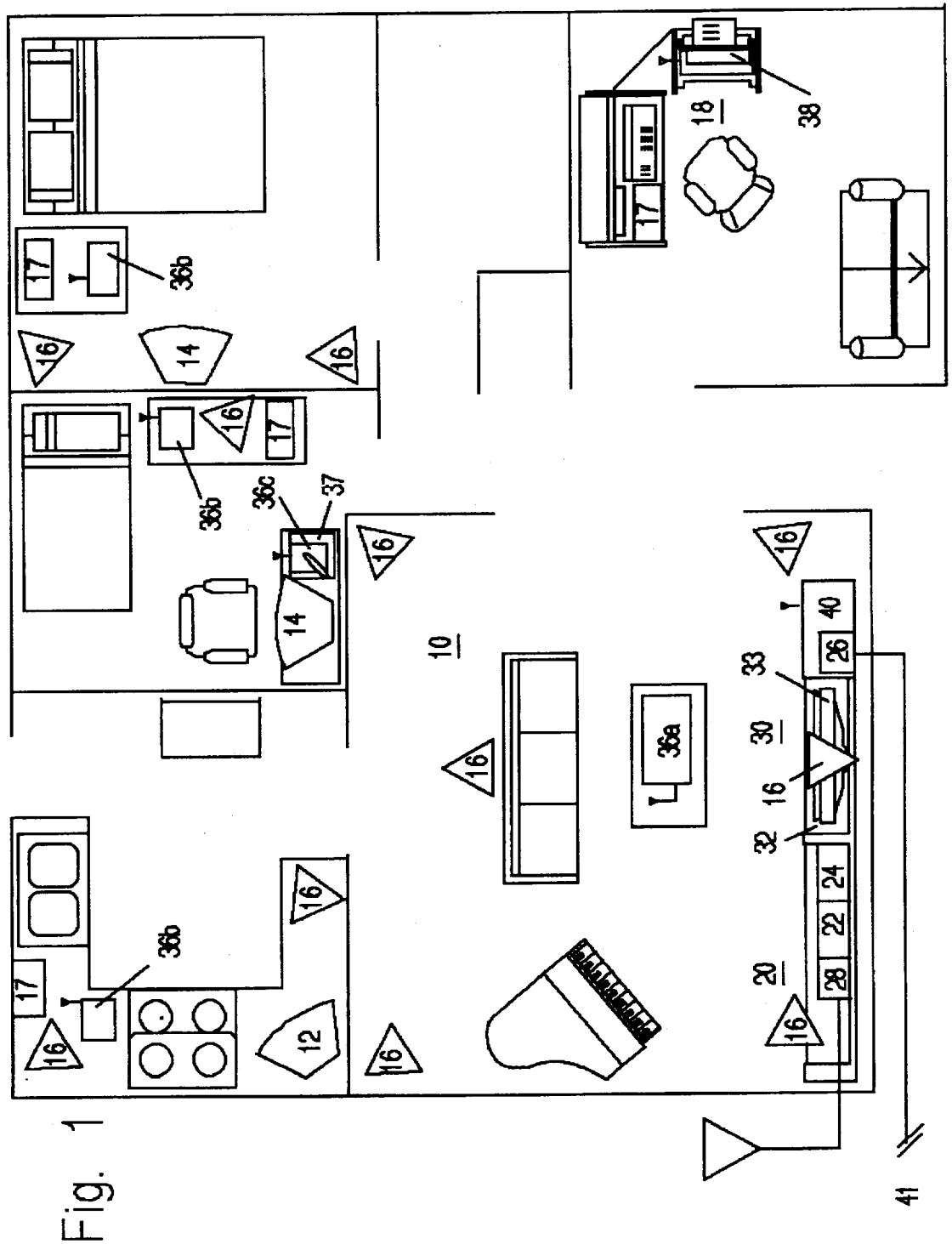
FIG. 1 is a schematic diagram of a hybrid entertainment system for the home in accordance with the present invention.
Figure 2:
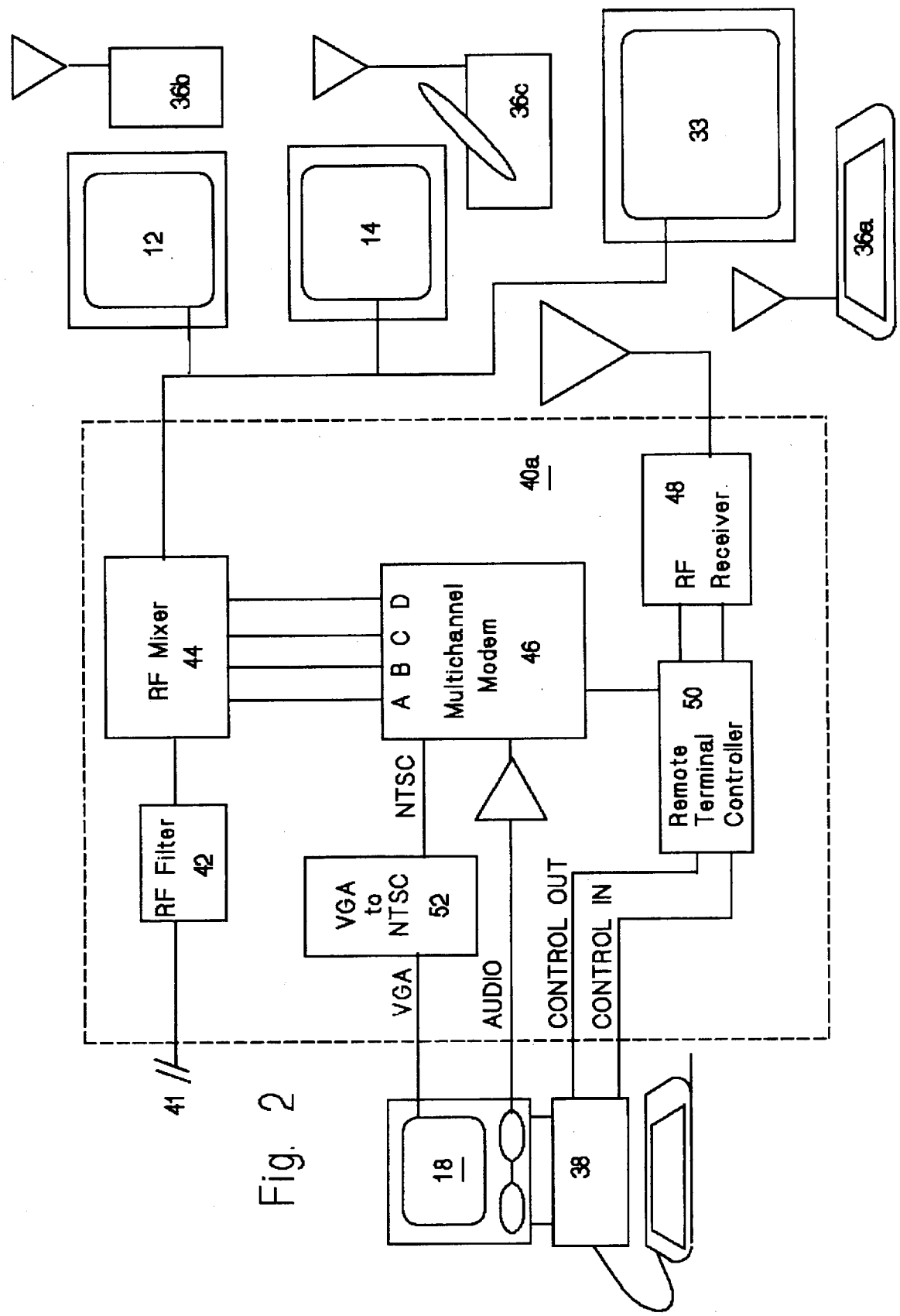
FIG. 2 is a block diagram of a hybrid database interface for database access and access coordination in accordance with the present invention.

FIG. 2 shows a hybrid database interface 40a for remote database access in accordance with the present invention for installation in the home office 18. In FIG. 1, the exterior cable service line 41 is connected directly to the hybrid interface 40 in the home entertainment center 10.

In accordance with the present invention, each of the control devices 36 includes a 900 MHz-band control transmitter that communicates entries made by the user to the database interface 40. Preferably each of the control devices 36 also provides IR-based remote channel control, for the user's convenience in switching to database access channels.

The keyboard 36a and the joystick 36c are upgraded for use with the database interface 40 by the addition of a plug-compatible switch between the keyboard 36a and the decoder 26 and between the joystick and the game controller 37, respectively. The pointer 36b is preferably the Altec-Lansing MediaPhone™ described in my patent application Ser. No. 08/503,590 filed Jul. 18, 1995, entitled "Computer Communications Device". That disclosure is incorporated herein by reference. The keypad 36b, however, transmits an RF remote control signal for the database interface 40, as well as providing the phone and media control functions of the MediaPhone™.

The interface 40 provides RF signals from the cable-TV head-end facility to the cable decoder 26 for the near-by decoder and video screen, and also to more remote decoders and screens through an FCC-compliant cable-subscriber RF filter 42, an RF mixer 44 and conventional coaxial cable connections (not shown). The RF mixer 44 in the interface 40 combines the subscriber RF signal with various multiple RF carriers locally generated by a multi-channel modulator 46. The modulator 46 converts information in both analog audio and digital computer signals from both direct-wire sources 18, 20 and a 900 MHz receiver 48 to cable channels above channel 80, the conventional limit of the commercial service programming.

In FIG. 2, the computer 18 is connected to the local RF modulator 46 by a conventional audio card and a VGA-to-video converter card, and also through a controller circuit 50 and an RS232 connector. In FIG. 1 a single Universal Signal Bus (USB) implements all these connections between the interface 40 and the computer 18. In FIG. 3 these connections are made through the computer's PCI bus.

In either system, the controller circuit 50 responds to digital commands received by wire from the computer 18 and by an RF receiver 54 from remote transmitters connected to the interactive-TV keyboard 36a, and RF pointer devices 36b, 36c. The operating procedure of the controller can be modified or reprogrammed from the computer. Preferably, the receiver operates in the frequency-shift keying (FSK) spread-spectrum mode in the 900 MHz band at 100 chips/sec.

FIG. 3 is a diagram of a further embodiment of the home entertainment system interface 40b for multimedia communication and remote database access. This interface is mounted on a modified video-controller card 38a that is installed in the computer 18 on the computer's internal PCI bus. This is most advantageous when the exterior cable service connection line is close to the PC.

To coordinate database access, the intercom 17 can be used to direct a second user to switch channels. However, the keyboard of the home-office computer 18 and the control keyboard 38a in the entertainment center 10 can also be used to supply e-mail communication between these locations in the form of a picture-in-picture "chat window" on the videos screens in these locations. For example, if a Pentium™ processor is used in the PC 18, it can convert e-mail text from these keyboards directly to TV videotext for real-time insertion into a picture-in-picture window on a video screen. This chat window can be inserted at any cable outlet 12, 14, 26, if a plug-compatible "chat box" is included in those cable outlets between the incoming cable from the interface 40 and the respective video screen at that outlet.

Preferably the chat box in each outlet 12, 14, 26 is an addressable video editor that responds to address and command signals passed through the cable by the interface 40. These address and command signals are passed from the interface 40 by the remote terminal controller 50 to selected remote video outlets and, selectably to the computer's own video screen, as a control signal modulating a given dedicated carrier frequency.

In this way, e-mail messages generated by someone using a battery-powered interactive-TV keyboard 36a in the entertainment center 10 or on the home-office PC 18 can be inserted at the bottom of the screen 14 in a child's room, where a video game is being played. Also, two users can play the same game While passing comments to each other, even at opposite ends of the house.

Similarly, if a question arises while the family's bank accounts are being reviewed on the home office computer 18, the question can be passed by e-mail to the kitchen outlet 12. Then the account information is shared by changing the channel at the kitchen outlet 12 from a recipe or grocery data channel to the channel on which the account data is carried in response to e-mail that appears in a chat window on the video screen.

Using the MediaPhone™ pointer devices, voice communication between these two parties can also be provided by the computer 18 in response to audio information in the broadcast RF signal. The computer 18 provides that information to the listener over the audio portion of the cable channel carrying the data video signal, using speakers provided by the cable TV or the multimedia computer at each location.

In addition, the remote database access interface permits members of the family to initiate and run searches of the CD-ROM or the Internet on the home office computer 18 from anywhere in the house, using the local video outlet and its keyboard, joystick or keypad pointer device.

It will be appreciated by one skilled in the art that variations and modifications are possible within the spirit and scope of the present invention. The embodiments described above illustrate presently preferred constructions and uses of the invention defined by the claims enumerated below.

I claim:

1. Database interface apparatus for supplying data from a personal computer to a remote video screen, said personal computer having a computer video screen, said remote video screen being connected by a cable to a subscriber video service, said apparatus comprising:

means for combining a subscription carrier frequency modulated by a video signal provided by the subscriber cable service cable, with a local carrier frequency modulated by a video signal provided by the personal computer;

means for providing said combined carrier frequencies to the cable connected to the remote video screen;

means for supplying data from the computer to the cable as video signals modulating said local carrier frequency;

means for receiving broadcast RF signals transmitted by an RF remote-control device; and means for controlling said data supplied by the personal computer in response to said RF signals to modulate said local carrier frequency.

2. The apparatus of claim 1 wherein said means for combining carrier frequencies also combines therewith an e-mail carrier frequecy modulated by an e-mail signal provided by the personal computer, and said RF signals include RF e-mail control signals, said apparatus further comprising:

means for supplying formatting and message data in an e-mail signal so as to provide information needed to produce picture-in-picture video in response to said RF e-mail control signals.

3. The apparatus of claim 2 wherein said formatting and message data also includes address data indicating the destination of said e-mail message in the e-mail signal provided by said personal computer.

4. Database interface apparatus for connecting a personal computer to a remote video screen, said computer having a computer video screen, said remote video screen being connected by cable to a subscriber cable video service, said apparatus comprising:

an RF broadcast receiver;

a controller connected to said receiver and to said computer, said controller being responsive to said personal computer and to said receiver to select a local carrier frequency for supplying video signals from said computer to said remote video screen through said cable;

a multi-channel modulator adapted to supply a signal from the computer to the remote video screen on said local carrier frequency selected by said controller; and an RF mixer adapted to combine a subscription carrier frequency modulated by a video signal from the cable video subscriber service with said local carrier frequency modulated by a video signal from said personal computer.

5. A method of providing remote access to a household database stored on a personal computer at a remote video screen, said personal computer having a computer video screen, said remote video screen connected by a cable to a subscriber video service, said method comprising the steps of:

mixing a subscription carrier frequency modulated by a video signal from the subscriber cable service with a local carrier frequency modulated by a video signal from the personal computer;

providing said combined video-modulated carrier signal to the remote video screen through the cable;

determining the frequency of the video-modulated carrier signal supplied by the personal computer;

supplying data signals from the computer to the cable on said carrier frequency; and receiving RF signals from an RF remote-control device, said RF signals controlling data received as a video-modulated carrier signal by the remote video screen from the personal computer through the cable on said carrier frequency.

6. The method of claim 5 further including the steps of:

receiving an RF e-mail control signal;

combining an e-mail carrier frequecy modulated by an e-mail signal provided by the personal computer with a subscription carrier frequency modulated by a video signal provided by the subscriber cable video service and a local carrier signal modulated by a video signal provided by the personal computer;

supplying formatting and message data in an e-mail signal so as to provide information needed to produce picture-in-picture video on a remote video screen in response to said RF e-mail control signal.

7. The method of claim 5 further comprising the step of supplying address data indicating the destination of said e-mail data in said e-mail signal provided by the personal computer.

8. A method of providing remote access to a household database stored on a personal computer to a remote video screen connected by cable to a subscriber video service, said method comprising the steps of:

combining a subscription carrier frequency modulated by a video signal provided by the subscriber cable video service, with a local carrier signal modulated by a video signal provided by the personal computer;

providing said combined carrier signals to the cable connected to the remote video screen;

selecting a carrier frequency to be modulated by a video signal supplied by the personal computer;

supplying data from the computer to the cable as the video signal modulating said carrier frequency;

receiving broadcast RF signals from an RF remote-control device; and controlling the data supplied by the personal computer in response to said RF signals.

9. A method of providing remote access to a household database stored on a personal computer for a user viewing a remote video screen, said remote video screen connected by a cable to a subscriber video service, said method comprising the steps of:

connecting an interface circuit between the remote video screen and the subscriber video service, said interface circuit including means for combining a subscription carrier frequency modulated by a video signal provided by the subscriber cable service cable, with a local carrier frequency modulated by a video signal provided by the personal computer, means for providing said combined carrier frequencies to the cable connected to the remote video screen, means for supplying data from the computer to the cable as video signals modulating said local carrier frequency, means for receiving broadcast RF signals, and means for controlling said data supplied by the personal computer in response to said broadcast RF signals to modulate said local carrier frequency; and supplying a control input device for the user viewing the remote video screen, said device having an RF broadcast transmitter.

10. The method of claim 9 further comprising the step of connecting said transmitter between the remote video screen and a control input device connected to the video screen.

11. The method of claim 9 further comprising the step of connecting a chat box between the remote video screen and the cable connected to the subscriber cable video service.

12. A hybrid home entertainment system for supplying data from a personal computer to a remote video screen, said personal computer having a computer video screen, said remote video screen being connected by a cable to a subscriber video service, said apparatus comprising:

means for combining a subscription carrier frequency modulated by a video signal provided by the subscriber cable service cable, with a local carrier frequency modulated by a video signal provided by the personal computer;

means for providing said combined carrier frequencies to the cable connected to the remote video screen;

means for supplying data from the computer to the cable as video signals modulating said local carrier frequency;

means for receiving broadcast RF signals transmitted by an RF remote-control device;

means for controlling said data supplied by the personal computer in response to said RF signals to modulate said local carrier frequency; and means for supplying said RF signal.

13. The system of claim 12 wherein said means for supplying said broadcast RF signal includes a microphone and said broadcast RF signal includes audio information.

14. The system of claim 12 wherein said interface combines an e-mail carrier frequency with modulated by an e-mail signal provided by the personal computer with a subscription carrier frequency modulated by a video signal provided by the subscriber cable video service and a local carrier signal modulated by a video signal provided by the personal computer, said system further comprising:

means responsive to said e-mail carrier frequency for providing picture-in-picture e-mail messages, whereby database work at multiple locations can be readily coordinated.

15. The system of claim 12 wherein said means for supplying said broadcast RF signal includes means for supplying an IR signal for controlling the channel displayed by the remote video screen.

* * * * *